(12) United States Patent
Cardinal et al.

(10) Patent No.: US 7,573,160 B2
(45) Date of Patent: Aug. 11, 2009

(54) METHODS AND APPARATUS FOR CONTROLLING WINDFARMS AND WINDFARMS CONTROLLED THEREBY

(75) Inventors: Mark Edward Cardinal, Altamont, NY (US); Jignesh Govindlal Gandhi, Simpsonville, SC (US); Andreas Kirchner, Wallenhorst (DE); Reinhard Brugger, Gronau (DE)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 11/185,474

(22) Filed: Jul. 20, 2005

(65) Prior Publication Data

US 2007/0018510 A1    Jan. 25, 2007

(51) Int. Cl.
   *H02J 3/46*      (2006.01)
   *H02P 9/00*      (2006.01)
(52) U.S. Cl. .......................... 307/153; 307/57; 307/84
(58) Field of Classification Search ............... 307/153, 307/57, 84
   See application file for complete search history.

(56) References Cited

U.S. PATENT DOCUMENTS

| 4,400,659 | A | * | 8/1983 | Barron et al. ............... 322/32 |
| 6,181,099 | B1 | | 1/2001 | Bixel et al. |
| 6,486,568 | B1 | | 11/2002 | King et al. |
| 6,681,156 | B1 | | 1/2004 | Weiss |
| 6,906,431 | B2 | | 6/2005 | Wobben |
| 6,924,563 | B2 | | 8/2005 | Garces et al. |
| 2005/0028017 | A1 | | 2/2005 | Janakiraman et al. |
| 2005/0042098 | A1 | | 2/2005 | Wobben |
| 2005/0090937 | A1 | | 4/2005 | Moore et al. |
| 2005/0132241 | A1 | | 6/2005 | Curt et al. |
| 2005/0219872 | A1 | | 10/2005 | Lys |

FOREIGN PATENT DOCUMENTS

| WO | WO 99/36695 | 7/1999 |
| WO | WO 2005/036281 A2 | 4/2005 |
| WO | WO 2005/036282 A1 | 4/2005 |

* cited by examiner

*Primary Examiner*—Albert W Paladini
*Assistant Examiner*—Carlos Amaya
(74) *Attorney, Agent, or Firm*—James McGinness, Esq.; Armstrong Teasdale LLP

(57) ABSTRACT

A method for controlling power produced by a windfarm includes regulating active power produced by the windfarm in accordance with an apparent power setpoint, and regulating a power factor of the windfarm in accordance with a power factor setpoint. However, during periods in which the apparent power setpoint is approached or exceeded, the method includes reducing a magnitude of an angle of a power factor setpoint towards zero and regulating the power factor of the windfarm in accordance with the reduced power factor setpoint angle magnitude.

20 Claims, 3 Drawing Sheets

METHODS AND APPARATUS FOR CONTROLLING WINDFARMS AND WINDFARMS CONTROLLED THEREBY

BACKGROUND OF THE INVENTION

This invention relates generally to wind turbine energy generation systems and more particularly to methods and apparatus for controlling power generated therefrom and to the wind turbine energy generation systems controlled by such methods and apparatus.

It is a common desire to regulate and/or limit apparent power in wind power plants (hereinafter referred to as "windfarms"). Otherwise, the power generated from the windfarm will vary with the power captured by the blades of each turbine, and that power varies with and the captured power is highly dependent upon instantaneous wind speed. Power can be regulated by, for example, pitching the blades of the wind turbines or rotating the axis of the rotor away from the direction of the wind.

The output of a wind farm can be characterized, at least in part, by an apparent power. The apparent power is the sum of the actual, real power, measured in watts and dissipated through a resistive load, and the reactive power, measured in VARs. The sum of the squares of the real power and of the reactive power is equal to the square of the apparent power. Many uses of windfarms require that the apparent power, i.e., volts times amperes, be limited as a scalar quantity. However, to a wire, the transmission of power corresponds to voltage and amperage. It is often necessary to limit the amperage being sent onto a transmission line, because it is this quantity that results in the heating of components or of the transmission line itself and that causes circuit breakers to trip. Thus, it is sometimes desired to limit apparent power to avoid overload conditions in certain locations along a transmission line or to prevent overloading a piece of equipment rated in Volt-Amperes. If the rated voltage is exceeded, the electrical equipment will break down and spark. If the rated amperage is exceeded, the component will overheat. Thus, it can be useful to limit apparent power and power factor.

BRIEF DESCRIPTION OF THE INVENTION

In one aspect, some configurations of the present invention therefore provide a method for controlling power produced by a windfarm. The method includes regulating active power produced by the windfarm in accordance with an apparent power setpoint, and regulating a power factor of the windfarm in accordance with a power factor setpoint. However, during periods in which the apparent power setpoint is approached or exceeded, the method includes reducing a magnitude of an angle of a power factor setpoint towards zero and regulating the power factor of the windfarm in accordance with the reduced power factor setpoint angle magnitude.

In another aspect, some configurations of the present invention provide an apparatus for controlling power produced by a windfarm. The apparatus is configured to regulate active power produced by the windfarm in accordance with an apparent power setpoint, and regulate a power factor of the windfarm in accordance with a power factor setpoint. However, during periods in which the apparent power setpoint is approached or exceeded, a magnitude of an angle of a power factor setpoint is reduced towards zero and the apparatus is further configured, during these periods, to regulate the power factor of the windfarm in accordance with the reduced power factor setpoint angle magnitude.

In yet another aspect, some configurations of the present invention provide a regulated windfarm. The regulated windfarm includes one or more wind turbines having a combined output coupled to a utility grid and measuring instruments configured to provide measurements of at least apparent power and power factor. The regulated windfarm further includes an apparent power control loop responsive to an apparent power setpoint and a measured apparent power to provide power commands to the one or more wind turbines to regulate the active power output of the windfarm towards the apparent power setpoint. The regulated windfarm also includes a power factor control loop responsive to the measured apparent power and the measured power factor to regulate a power factor of the windfarm in accordance with a power factor setpoint. The power factor loop further includes a power factor foldback function so that during periods in which the apparent power setpoint is approached or exceeded, an angle magnitude of the power factor setpoint is reduced towards zero and the power factor control loop regulates the power factor of the windfarm in accordance with the reduced power factor setpoint angle magnitude.

It will be appreciated that various configurations of the present invention allow increased or even maximum active power to be produced during periods of high wind and seamlessly transfer to the correct power factor during periods of lower winds.

DETAILED DESCRIPTION OF THE INVENTION

As used herein, all signals that relate to values or measurements in a system are considered as "signals indicative of" the values or measurements. Such signals can be scaled, offset, or mapped in an appropriate manner as a design choice to facilitate circuit design. A "signal indicative of" a value or measurement can be, for example, an analog voltage from a control or measuring device or a digital value stored in a memory or measured using a digital measuring instrument. Unless otherwise noted, such a signal can include a scaling factor, an offset, or another mapping as a design choice to facilitate the implementation of functional blocks of circuitry described herein.

Figure 1:
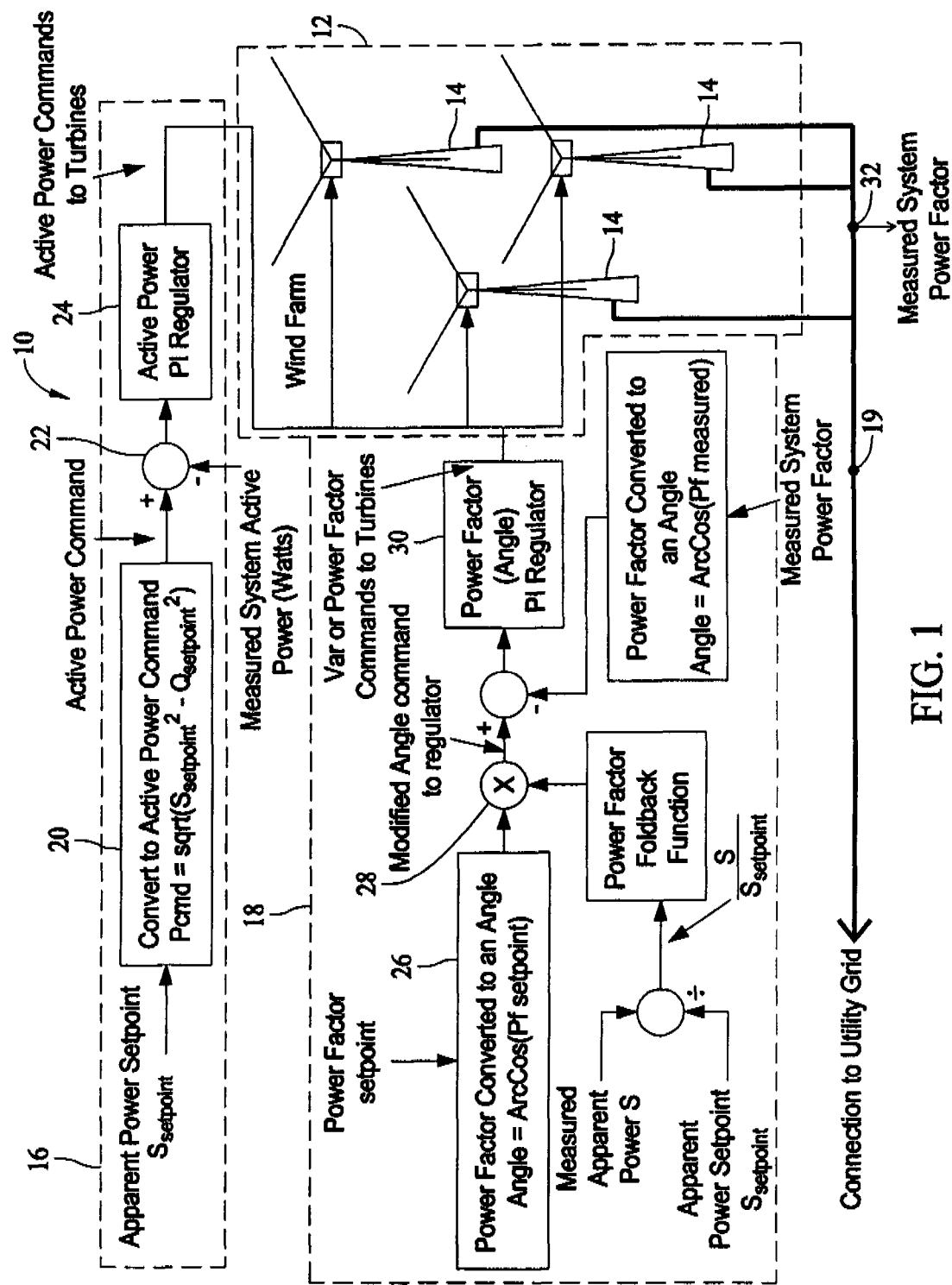
FIG. 1 is a pictorial block diagram of a configuration of a regulated windfarm system.

In some configurations of the present invention and referring to FIG. 1, a windfarm control system 10 for a windfarm 12 comprising one or more wind turbines 14 includes an apparent power control loop 16 and a power factor control loop 18. Apparent power control loop 16 regulates active power of windfarm 12 in accordance with an apparent power setpoint. Power factor control loop 18 regulates a power factor of the windfarm in accordance with a power factor setpoint, except that, during periods in which the apparent power setpoint is approached or exceeded, the magnitude of an angle of a power factor setpoint is reduced towards zero, and power factor control loop regulates the power fact of windfarm 12 in accordance with the reduced power factor setpoint angle magnitude.

Apparent power, referred to herein as S, is measured by an appropriate measuring instrument (not shown in the Figures)

at a point 19 at an output of windfarm 12 at which a summed aggregate total power from the one or more wind turbines 14 is electrically connected to a utility grid (not shown in detail in FIG. 1). The apparent power of the farm is controlled by reducing an active power component, referred to herein as P, of the electrical apparent power of windfarm 12. Because apparent power control loop 16 is configured to reduce only an active power component to regulate the apparent power, simultaneous regulation of the power factor by power factor control loop 18 is possible, wherein the power factor is related to the relative amounts of active power and reactive power.

More particularly, a signal indicative of an apparent power setpoint $S_{setpoint}$ is input to apparent power control loop 16. This signal is converted to an active power command at block 20, which is a command indicative of the value $\sqrt{S_{setpoint}^2 - Q_{measured}^2}$. This command is thus indicative of the actual number of watts to be produced, P, where $S^2 = P^2 + Q^2$. The active power command is modified by the effective subtraction of the measured system active power $P_{measured}$ at a subtraction block 22, and the result input to an active power regulator, such as active power proportional integrator (PI) 24. The output is an active power command that is sent to windfarm 12. Although not explicitly shown in FIG. 1, the active power command sent to windfarm 12 is distributed to one or more wind turbines 14 to effect a change in power output. In some configurations of the present invention, the active power command may comprise a plurality of commands configured to effect different changes in power output from each wind turbine.

More specifically, a relationship between apparent power, active power, and reactive power and power factor is written as:

S=apparent power (in VA),
P=active power (in watts),
Q=reactive power (in VARS), and
$S^2 = P^2 + Q^2$.

A power angle ($\phi$) is defined as a geometric relationship between the reactive power and active power components written:

$\phi = \tan^{-1}(Q/P)$.

A power factor PF is then defined as the cosine of the power angle $\phi$:

$PF = \cos(\phi)$.

Because power factor PF maps directly to power angle $\phi$, there is no difference, insofar as the present invention is concerned, between regulating a power factor of a windfarm in accordance with a power factor setpoint on the one hand, and regulating the power factor in accordance with the magnitude of the angle of the power factor setpoint on the other. Moreover, by reducing the magnitude of the angle of the power factor setpoint, the power factor setpoint value is also reduced. Therefore, if a value is dependent upon a reduced power factor angle magnitude, it is also considered dependent upon a reduced power factor setpoint.

Referring again to FIG. 1, a power factor setpoint $PF_{setpoint}$ is input to power factor control loop 18. In some configurations, $PF_{setpoint}$ is converted to an angle in a block 26 that determines $\cos^{-1}(PF_{setpoint})$. This angle is multiplied at 28 by a power factor foldback function Foldback($S/S_{setpoint}$) is then determined at multiplier 28 to obtain a modified angle command for a power factor (angle) regulator 30, such as a PI regulator. Before this modified angle command is applied to power factor (angle) regulator 30, the measured system power factor $PF_{measured}$ measured by a suitable measuring instrument (not shown in FIG. 1) at 32 is converted to an angle $\phi_{measured} = \cos^{-1}(PF_{measured})$. The result $\phi_{measured}$ is subtracted from the modified angle command. The output of power factor (angle) regulator is a VAR or power factor command to turbine farm 12. In some configurations, the VAR or power factor command comprises a plurality of different commands to separately control individual turbines 14.

The apparent power regulator 16 and power factor regulator 18 functions allow a windfarm 12 to simultaneously regulate power factor and apparent power when the power of the wind plus the VARs required to maintain the correct power factor are less than the required apparent power setpoint. During periods in which the wind speed (active power produced by turbines 14 of windfarm 12) approaches the apparent power setpoint $S_{setpoint}$, the power factor foldback function Foldback($S_{measured}/S_{setpoint}$) in some configurations continuously and seamlessly reduces the power factor of windfarm 12, thereby allowing an increased production of active power. This advantage is transparent to control regulators 24 and 30 and need not induce any mode switching or step changes in active or reactive power production.

In some configurations, power factor foldback function Foldback($S_{measured}/S_{setpoint}$) linearly reduces the power angle, effectively driving the power factor to unity when the apparent power $S_{measured}$ of the windfarm approaches an adjustable threshold $S_{threshold}$ which can be represented as a percentage of the apparent power setpoint $S_{setpoint}$. In some configurations, when the measured apparent power $S_{measured}$ of windfarm 12 is less than the foldback threshold $S_{threshold}$, no modifications to the power angle setpoint $S_{setpoint}$ are performed and the output of Foldback($S_{measured}/S_{setpoint}$) is effectively unity.

On the other hand, in some configurations of the present invention, when the apparent power $S_{measured}$ of windfarm 12 approaches and/or exceeds the apparent power setpoint $S_{setpoint}$, the effective value of the function Foldback($S_{measured}/S_{setpoint}$) begins monotonically decreasing from 1 to 0. (The "effective value" ignores scaling and offsets such as those that might be introduced in particular configurations to simplify circuit design.) The output of Foldback($S_{measured}/S_{setpoint}$) clamps at 0 in some configurations when the apparent power $S_{measured}$ of windfarm 12 exceeds or reaches the apparent power setpoint $S_{setpoint}$. The output of 0 is multiplied by the power angle command, and the result will always produce a power factor PF of 1, because $\cos(0)=1$.

Figure 2:
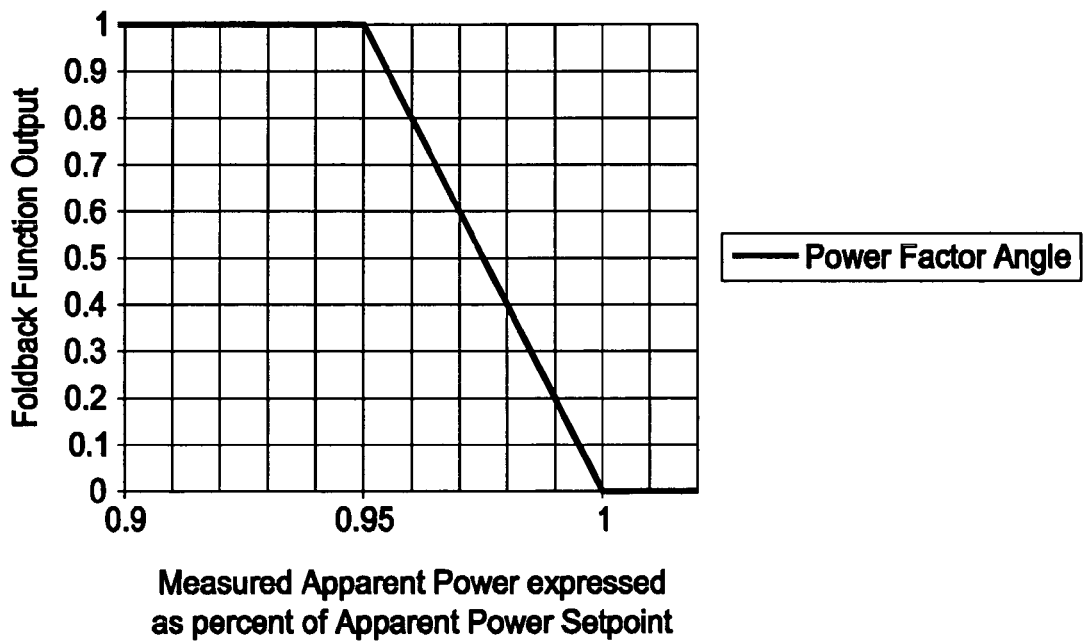
FIG. 2 is a graph showing the output of a foldback function as a function of measured apparent power with a 95% threshold.

Thus, in some configurations, a magnitude of the angle of the power factor setpoint is reduced towards zero by a process and functional block that utilizes a function dependent upon measured apparent power, the apparent power setpoint, and a foldback threshold. In some configurations and referring to FIG. 2, the foldback threshold is set at a point at which the measured apparent power is 95% of the apparent power setpoint. However, the foldback threshold in other configurations is set at a different percentage of the apparent power setpoint. For example, in some configurations, the foldback threshold is set at 85%. In other configurations, it is set at 90%. In still other configurations, it is set at 95%, as in the illustrated configuration, and in still others, at 100%. In some configurations, it is set at a selected percentage value within a range having upper and lower limits selected from these percentage values. Lower percentage values than 85% could be used in some configurations, although such configurations may not provide optimum results. Also, in some configurations, the reduction occurs only when the measured apparent power of windfarm 12 is greater than the apparent power setpoint.

In some configurations, the reduction is a linear reduction as a function of apparent power. Also in some configurations, the reduction is a monotonic decrease to zero, and/or the reduction is clamped at zero when the apparent power reaches or exceeds the apparent power setpoint.

In some configurations of the present invention, the measured apparent power $S_{measured}$ is filtered to remove short-term variations. Next, some configurations determine Foldback($S_{measured}/S_{setpoint}$) as a result of a test stated as, If measured apparent system power $S_{measured}$ is greater than the apparent power setpoint $S_{setpoint}$ times a threshold T, then output a signal indicative of the value of the expression written as:

$$\frac{1-(S_{measured}/S_{setpoint})}{1-T},$$

otherwise output a signal indicative of the value 1.

The output is clamped to zero if the measured apparent power $S_{measured}$ is greater than the apparent power setpoint $S_{setpoint}$.

In some configurations of the present invention, an apparent power regulator block and a power factor regulator block are used in conjunction with the windfarm to simultaneously regulate power factor and apparent power when the power of the wind plus the VARs required to maintain the correct power factor are less than the required apparent power setpoint. During periods in which wind speed approaches the apparent power setpoint and active power produced by the turbines or windfarm increases, a foldback function is used to reduce the power factor of the windfarm. In some configurations, this reduction is continuous and/or seamless. The foldback function thus allows the windfarm to increase, and in some configurations, maximize its active power production. Also, in some configurations, the increase in active power production can be provided transparently to control regulators and need not induce mode switching or step changes in active or reactive power production.

The power factor foldback function provides a reduction in the power angle, effectively driving the power factor to unity or at least a value near unity when the apparent power of the windfarm approaches an adjustable threshold value. In some configurations, the power factor foldback function is a linear function that linearly reduces the power angle. In other configurations, the power factor foldback function is a monotonically decreasing function, and in still other configurations, it is a non-increasing function, or at least a substantially non-increasing function that has no substantial region of increasing values. The adjustable threshold value can be represented as a percentage of the apparent power setpoint. When the measured apparent power of the windfarm is less than the threshold, little or no modification to the power angle setpoint is made in some configurations of the present invention and the output of the foldback function can be assigned a value of 1.

In some configurations, when the apparent power of the windfarm approaches or exceeds the apparent power setpoint, the output of the foldback function begins decreasing from 1 to 0. The output of the foldback function will clamp at 0 when the apparent power of the windfarm exceeds or reaches the apparent power setpoint. An output of 0 on the foldback function will be multiplied by the power angle command, which in some configurations, always produces a power factor of 1, because cos(0)=1.

Figure 3:
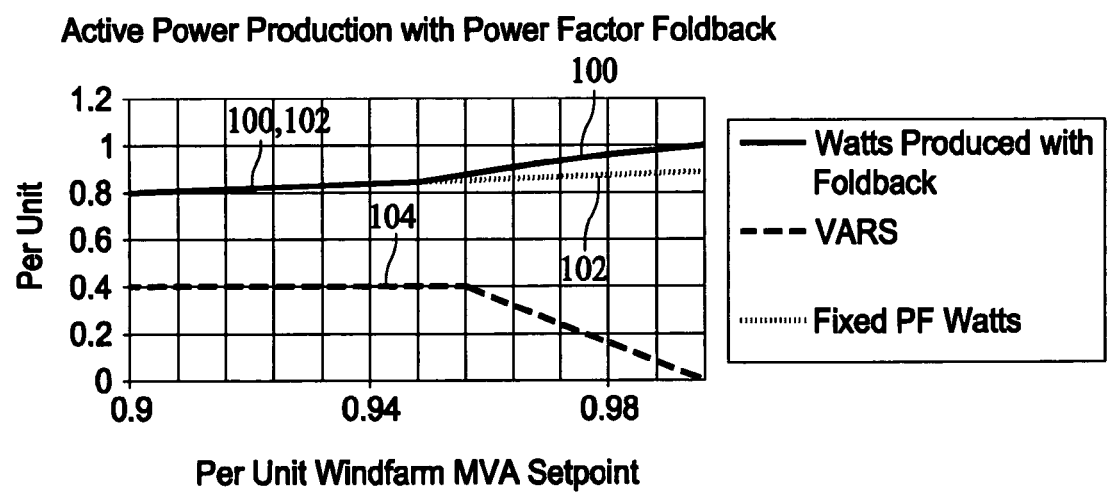
FIG. 3 is a graph showing active power production per unit for the windfarm of FIG. 1.

In some configurations and referring to FIG. 3, the amount of active power production 100 in watts per unit windfarm MVA (apparent power) is increased beyond a threshold (in this case, 95% of the MVA setpoint) relative to the active power that would have been produced 102 without the foldback function. The power factor is decreased, as indicated by reduced VARs 104 above the setpoint.

The threshold shown in FIG. 3 differs in some other configurations of the present invention. For example, the threshold in some configurations is a selected value between 85% to 100% of the MVA setpoint. In some configurations, the threshold is 85%, 90%, 95%, or 100%, or within a range between any two of these values. Lower percentage values could be used in some configurations, but may not provide optimum results.

It will thus be appreciated that some configurations of the present invention allow increased or even maximum active power to be produced during periods of high wind and seamlessly transfer to the correct power factor during periods of lower winds.

While the invention has been described in terms of various specific embodiments, those skilled in the art will recognize that the invention can be practiced with modification within the spirit and scope of the claims.

What is claimed is:

1. A method for controlling power produced by a windfarm that includes a generator, said method comprising:
   regulating active power produced by the windfarm in accordance with an apparent power setpoint, wherein regulating active power comprises manipulating a mechanical input to the generator; and
   regulating a power factor of the windfarm in accordance with a power factor setpoint, except that, during periods in which the apparent power setpoint is approached or exceeded, reducing a magnitude of an angle of a power factor setpoint towards zero and regulating the power factor of the windfarm in accordance with the reduced power factor setpoint angle magnitude.

2. A method in accordance with claim 1 wherein said reducing the magnitude of the angle of the power factor setpoint towards zero further comprises folding back a power factor setpoint angle utilizing a function dependent upon measured apparent power, the apparent power setpoint, and a foldback threshold.

3. A method in accordance with claim 2 wherein the function dependent upon a ratio of apparent power to the apparent power setpoint reduces the power factor setpoint angle only when the measured apparent power of the windfarm is greater than the apparent power setpoint.

4. A method in accordance with claim 3 wherein the reduction is a linear reduction as a function of apparent power.

5. A method in accordance with claim 3 wherein the reduction is a monotonic decrease to zero.

6. A method in accordance with claim 5 wherein the reduction is clamped at zero when the apparent power reaches or exceeds the apparent power setpoint.

7. A method in accordance with claim 2 wherein the foldback threshold is set at a point at which the measured apparent power is a selected value between 85% and 100% of the apparent power setpoint.

8. An apparatus for controlling power produced by a windfarm that includes a generator, said apparatus configured to:
   regulate active power produced by the windfarm in accordance with an apparent power setpoint, wherein said aparatus regulates active power by manipulating a mechanical input to the generator; and
   regulate a power factor of the windfarm in accordance with a power factor setpoint, except that, during periods in which the apparent power setpoint is approached or exceeded, reduce a magnitude of an angle of a power factor setpoint towards zero and regulating the power factor of the windfarm in accordance with the reduced power factor setpoint angle magnitude.

9. An apparatus in accordance with claim 8 wherein to reduce the magnitude of the angle of the power factor setpoint towards zero, said apparatus further configured to fold back a power factor setpoint angle utilizing a circuit block configured to effect a foldback dependent upon measured apparent power, the apparent power setpoint, and a foldback threshold.

10. An apparatus in accordance with claim 9 wherein the circuit block configured to effect a foldback dependent upon a ratio of apparent power to the apparent power setpoint is configured to reduce the power factor setpoint angle only when the measured apparent power of the windfarm is greater than the apparent power setpoint.

11. An apparatus in accordance with claim 10 wherein the reduction is a linear reduction as a function of apparent power.

12. An apparatus in accordance with claim 10 wherein the reduction is a monotonic decrease to zero.

13. An apparatus in accordance with claim 12 wherein the circuit block configured to effect a foldback dependent upon a ratio of apparent power to the apparent power setpoint clamps the foldback at zero when the apparent power reaches or exceeds the apparent power setpoint.

14. An apparatus in accordance with claim 9 wherein the foldback threshold is set at a point at which the measured apparent power is a selected value between 85% and 100% of the apparent power setpoint.

15. A regulated windfarm comprising:
one or more wind turbines having a combined output coupled to a utility grid;
a generator coupled to each of said one or more wind turbines;
measuring instruments configured to provide measurements of at least apparent power and power factor;
an apparent power control loop responsive to an apparent power setpoint and a measured apparent power to provide power commands to the one or more wind turbines to regulate the active power output of the windfarm towards the apparent power setpoint, wherein a mechanical input to the generator is manipulated to regulate the active power output of the windfarm; and
a power factor control loop responsive to the measured apparent power and the measured power factor to regulate a power factor of the windfarm in accordance with a power factor setpoint, said power factor loop further including a power factor foldback function so that during periods in which the apparent power setpoint is approached or exceeded, an angle magnitude of the power factor setpoint is reduced towards zero and said power factor control ioop regulates the power factor of the windfarm in accordance with the reduced power factor setpoint angle magnitude.

16. A windfarm in accordance with claim 15 wherein to reduce the angle magnitude of the power factor setpoint towards zero, said apparatus further configured to fold back a power factor setpoint angle utilizing a circuit block configured to effect a foldback dependent upon measured apparent power, the apparent power setpoint, and a foldback threshold.

17. A windfarm in accordance with claim 16 wherein the circuit block configured to effect a foldback dependent upon a ratio of apparent power to the apparent power setpoint is configured to reduce the power factor setpoint angle only when the measured apparent power is greater than the apparent power setpoint.

18. A windfarm in accordance with claim 17 wherein the reduction is a linear reduction as a function of apparent power.

19. A windfarm in accordance with claim 17 wherein the reduction is a monotonic decrease to zero.

20. A windfarm in accordance with claim 19 wherein the circuit block configured to effect a foldback dependent upon a ratio of apparent power to the apparent power setpoint is configured to clamp the foldback at zero when the apparent power reaches or exceeds the apparent power setpoint.

* * * * *